(12) United States Patent
Balasubramanian et al.

(10) Patent No.: US 10,074,117 B2
(45) Date of Patent: Sep. 11, 2018

(54) APPLICATION SERVER AND/OR METHOD FOR SUPPORTING MOBILE ELECTRONIC COMMERCE

(75) Inventors: Chandra S. Balasubramanian, Lakewood, OH (US); Francis M. Sherwin, Cleveland Heights, OH (US); Christopher Baird, South Euclid, OH (US)

(73) Assignee: CARDINALCOMMERCE CORPORATION, Mentor, OH (US)

( * ) Notice: Subject to any disclaimer, the term of this patent is extended or adjusted under 35 U.S.C. 154(b) by 1698 days.

(21) Appl. No.: 12/119,272

(22) Filed: May 12, 2008

(65) Prior Publication Data

US 2008/0281722 A1 Nov. 13, 2008

Related U.S. Application Data

(60) Provisional application No. 60/928,587, filed on May 10, 2007.

(51) Int. Cl.
*G06Q 30/00* (2012.01)
*G06Q 30/06* (2012.01)

(52) U.S. Cl.
CPC ......... *G06Q 30/06* (2013.01); *G06Q 30/0633* (2013.01); *G06Q 30/0641* (2013.01)

(58) Field of Classification Search
CPC ................................................. G06Q 30/0601
USPC .......................................................... 705/51
See application file for complete search history.

(56) References Cited

U.S. PATENT DOCUMENTS

| | | | | |
|---|---|---|---|---|
| 6,256,633 B1* | 7/2001 | Dharap | ............. | G06F 17/30867 |
| 6,484,196 B1* | 11/2002 | Maurille | ....................... | 709/206 |
| 6,574,624 B1* | 6/2003 | Johnson | ............. | G06F 17/3064 |
| | | | | 707/750 |
| 6,944,447 B2* | 9/2005 | Portman et al. | ........... | 455/422.1 |
| 7,065,188 B1* | 6/2006 | Mei et al. | ................. | 379/88.23 |
| 7,620,407 B1* | 11/2009 | Donald et al. | ................ | 455/466 |
| 8,010,523 B2* | 8/2011 | Djabarov | ......... | G06F 17/30646 |
| | | | | 707/705 |

(Continued)

OTHER PUBLICATIONS

PCT International Search Report, International application No. PCT/US08/63439; dated Jul. 17, 2008, Form PCT/ISA/210, pp. 1-3.

*Primary Examiner* — Steven S Kim
(74) *Attorney, Agent, or Firm* — The Webb Law Firm

(57) ABSTRACT

An electronic platform (10) for facilitating mobile commerce transactions includes: a user interface (20) that is provided to a user (60), the user interface (20) being operable to retrieve from the user (60) a plurality of settings for different parameters that regulate a manner in which the platform (10) operates for a given entity that is being served by the platform (10); a conversation tracking engine (40) that monitors messages exchanged between the platform (10) and mobile device users (72) accessing the platform (10), the conversation tracking engine (40) being operative to recognize which ones of selected monitored messages together form a common conversation and keep track of a current state of that conversation; and, a mobile content rendering engine (30) that is operable to dynamically render mobile content in response to the platform (10) receiving a request from a mobile device (74) for mobile content, the mobile content being rendered in accordance with the parameter settings entered via the user interface (20).

17 Claims, 1 Drawing Sheet

(56) References Cited

U.S. PATENT DOCUMENTS

| | | | |
|---|---|---|---|
| 2002/0087408 A1* | 7/2002 | Burnett | G06Q 30/02 |
| 2002/0120712 A1* | 8/2002 | Maislin | G06F 17/30864 |
| | | | 709/217 |
| 2003/0126090 A1* | 7/2003 | Fukuoka et al. | 705/54 |
| 2005/0074028 A1* | 4/2005 | Wugofski | H04M 1/72561 |
| | | | 370/468 |
| 2005/0131695 A1* | 6/2005 | Lucente et al. | 704/257 |
| 2006/0058048 A1* | 3/2006 | Kapoor | G06Q 30/02 |
| | | | 455/466 |
| 2006/0128404 A1* | 6/2006 | Klassen | H04L 12/586 |
| | | | 455/466 |
| 2006/0129633 A1* | 6/2006 | Potluri et al. | 709/203 |
| 2006/0179022 A1* | 8/2006 | Holland | 706/45 |
| 2006/0184625 A1* | 8/2006 | Nordvik et al. | 709/204 |
| 2007/0100650 A1 | 5/2007 | Ramer et al. | |
| 2007/0174407 A1* | 7/2007 | Chen et al. | 709/207 |
| 2007/0219980 A1* | 9/2007 | Songfack | G06F 17/30306 |
| 2007/0266002 A1* | 11/2007 | Chowdhury | G06F 17/30648 |
| 2008/0027810 A1* | 1/2008 | Lerner | G06Q 30/02 |
| | | | 705/14.25 |
| 2008/0275864 A1* | 11/2008 | Kim | G06F 17/30867 |
| 2009/0144260 A1* | 6/2009 | Bennett | G06F 17/30681 |

* cited by examiner

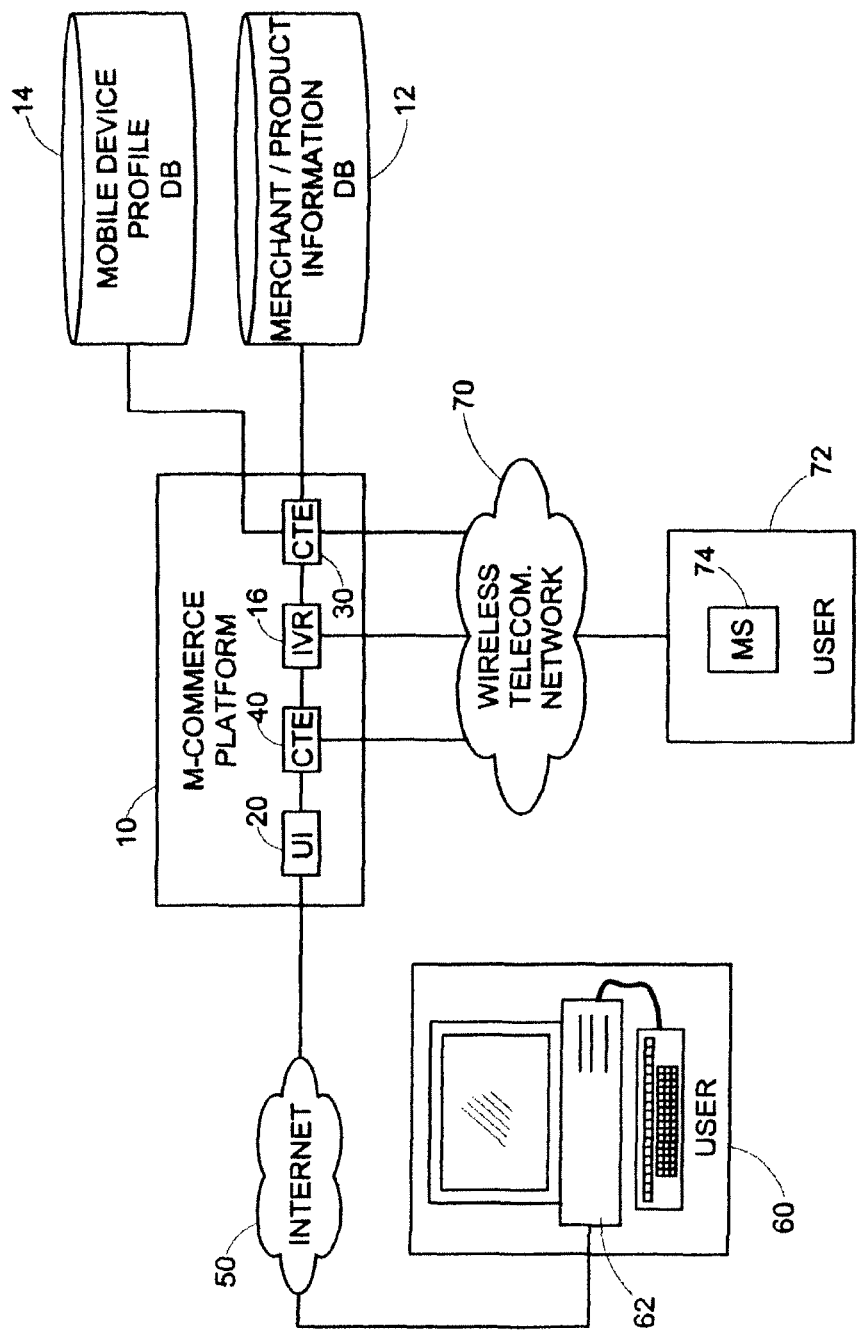

APPLICATION SERVER AND/OR METHOD FOR SUPPORTING MOBILE ELECTRONIC COMMERCE

CROSS-REFERENCES TO RELATED APPLICATIONS

This application claims the benefit of U.S. Provisional Application No. 60/928,587, filed May 10, 2007, which is incorporated herein by reference in its entirety.

FIELD

The presently disclosed subject matter relates to the art of mobile electronic commerce. It finds particular application in conjunction with purchase transactions initiated via mobile devices (e.g., such as a mobile telephone, a wireless personal digital assistant (PDA), a mobile "smart-phone" or other wireless telecommunications device) employing Short Message Service (SMS) and/or Wireless Application Protocol (WAP), and accordingly, one or more embodiments will be described with particular reference thereto. However, one of ordinary skill in the art will appreciate that the present disclosed subject matter is also amenable to other like applications.

BACKGROUND

Mobile electronic commerce, or m-commerce as it is otherwise known, relates to the buying and selling of products and services between consumers and merchants over wireless networks or other like transactional exchanges of information over similar telecommunication networks. The convenience of shopping over wireless telecommunication networks has sparked considerable interest in m-commerce on behalf of both consumers and merchants. M-commerce sales, or like transactions, have been typically carried out using standard credit cards such as Visa®, MasterCard®, Discover®, American Express®, or the like, or standard debit cards, i.e., check cards or automated teller machine (ATM) cards which directly access funds from an associated deposit account or other bank account, and more recently, alternative payment methods, such as PayPal®, Google Checkout®, eBillMe, Bill Me Later, NACHA and others.

Shopping and payment using these standard cards and alternative payment methods, however, in connection with m-commerce presents certain difficulties, particularly for merchants, including difficulties concerning the integration of product catalogs, pricing, payment acceptance and payment receipt over this new distribution channel, as well as difficulties regarding the authentication or positive identification of the proper holder of the payment account used if such a transaction were easily able to be carried out. For example, merchants often outsource development and maintenance of their Internet web-stores, including shopping cart, payment gateway and authentication service integration, to third parties, as much of the technical know-how to accomplish such an endeavor is far beyond the average merchant. The addition of integrating an additional emerging transaction channel, such as m-commerce is generally a prohibitive task for many merchants, both technically and financially. As well, as with Internet-based e-commerce, maintaining consumer confidence in security with respect to m-commerce has become difficult with increased reports of fraud. The resulting apprehension is also fueled by consumer uncertainty of the reputation or integrity of a merchant with whom the consumer is dealing. Questionable security of the consumer's card information or other personal information typically submitted along with a traditional e-commerce and/or m-commerce transaction (e.g., address, card number, phone number, etc.) serves to increase apprehension even more. Additionally, cardholders, merchants and financial institutions are all concerned about safeguarding against fraudulent or otherwise unauthorized transactions. These factors may also influence a merchant's decision whether to pursue delving into the m-commerce channel.

Accordingly, a new and improved apparatus and/or method for enabling merchants to create, manage and deliver product content, as well as to accept m-commerce transactions initiated via a wireless mobile device is disclosed that overcomes the above-referenced problems and others.

BRIEF SUMMARY

In accordance with one exemplary embodiment, an electronic platform for facilitating mobile commerce transactions includes: a user interface that is provided to a user, the user interface being operable to retrieve from the user a plurality of settings for different parameters that regulate a manner in which the platform operates for a given entity that is being served by the platform; a conversation tracking engine that monitors messages exchanged between the platform and mobile device users accessing the platform, the conversation tracking engine being operative to recognize which ones of selected monitored messages together form a common conversation and keep track of a current state of that conversation; and, a mobile content rendering engine that is operable to dynamically render mobile content in response to the platform receiving a request from a mobile device for mobile content, the mobile content being rendered in accordance with the parameter settings entered via the user interface.

In accordance with another exemplary embodiment, a method of facilitating mobile commerce transactions includes: providing a user interface to a user; receiving from the user via the user interface a plurality of settings for different parameters that regulate a manner in which an electronic platform performs operations for a given entity; monitoring messages exchanged between the platform and mobile device users accessing the platform over a wireless telecommunications network via respective mobile devices; recognizing which ones of selected monitored messages together form a common conversation; keeping track of a current state of the conversation; dynamically rendering mobile content in response to receiving a request from a mobile device for mobile content, the mobile content being rendered in accordance with the parameter settings entered via the user interface; and, sending the mobile content to the mobile device from which the request was received.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

FIG. 1 is a diagrammatic illustration showing the mobile e-commerce system embodying aspects of the presently disclosed subject matter.

DETAILED DESCRIPTION

For clarity and simplicity, the present specification shall refer to structural and/or functional elements, entities and/or facilities, relevant standards, protocols and/or services, and other components that are commonly known in the art without further detailed explanation as to their configuration or operation except to the extent they have been modified or altered in accordance with and/or to accommodate the preferred embodiment(s) presented herein.

With reference now to FIG. 1, there is shown a platform 10 for supporting m-commerce that includes three subsystems or components, namely, a user interface (UI) 20, a content rendering engine (CRE) 30, and a conversation tracking engine (CTE) 40. Suitably, the platform 10 is implemented as an application server running appropriate software to achieve the various functions described herein.

As shown in FIG. 1, the platform 10 is operatively connected in any conventional fashion to a public packet-switched or other suitable data network such as, e.g., the Internet 50. Also shown in FIG. 1, is a user 60 (e.g., a merchant or other suitable proxy) that is also operatively connected to the Internet 50, e.g., via an appropriate computer 62 or other like client device. While only one user 60 and/or one merchant are referenced herein for purposes of simplicity and/or clarity, it is to be appreciated that in practice there are generally a plurality of such users and/or merchants that are similarly arranged and/or served by the platform 10.

Suitably, the merchant or user 60 employs the computer 62 to access the UI 20 of the platform 10 over the Internet 50. For example, the UI 20 is optionally implemented as a web server that provides an interactive web-based interface with which the user 60 may selectively interact via a web or other appropriate browser running on their computer 62. In practice, the user 60 employs the UI 20 to set any one or more of a variety of parameters that ultimately regulate the m-commerce experience supported by the platform 10 for a particular merchant. That is to say, the UI 20 acts as a tool that the merchant or user 60 may selectively employ to dynamically customize the behavior of the platform 10 (including the CRE 30 and the CTE 40) for a particular merchant.

In practice, the information and/or data entered or otherwise submitted by the merchant or user 60 via the UI 20 is ultimately parsed and/or stored in a suitable location that is accessible by the platform 10, e.g., such as the merchant/product information database (DB) 12 illustrated in FIG. 1. Accordingly, the information and/or data can be selectively recalled and/or otherwise used by the platform 10 and/or the relevant components thereof to achieve the desired customized output or other results.

In a suitable embodiment, the UI 20 provides an initial set-up screen or webpage into which selected merchant information can be entered and/or modified, e.g., by the user 60. Suitably, pertinent merchant information optionally includes: the merchant's name, address and/or other contact information, logo, etc. The merchant information may also optionally include relevant information (e.g., account numbers or other identifiers, etc.) about one or more various accounts which the merchant owns or which are otherwise maintained for the merchant to accept payment and/or receive funds from a variety of different payment brands. Suitably, this merchant account information allows the platform 10 to interact with payment processors for the various payment brands on behalf of the merchant to initiate the authorization and/or settlement of funds for a given transaction.

Optionally, on another screen or webpage, the UI 20 provides an interface that is selectively accessed by the merchant or user 60 to define one or more products or services that may be sold in connection with or are otherwise the objects of transactions supported by the platform 10. In practice, the UI 20 permits the merchant or user 60 to specify any one or more parameters for each product or service, nominally referred to herein as product parameters. For example, suitable product parameters optionally include: a product name, a price for the product, a SKU (Stock Keeping Unit) number or the like, an image of the product, a product description, a product category or other designation used to selectively sort multiple products into particular lists, category headings or menus, etc. Additionally, the merchant or user 60 may also optionally employ the interface to specify a particular URL (Uniform Resource Locator) address or the like for particular products, and/or specify particular keywords which are to be associated with a particular product. In addition to specifying product parameters, the merchant or user 60 can also optionally employ the UI 20 to set-up catalog headers and/or menus under which various products can be categorized or otherwise listed. Finally, with respect to particular products, the merchant or user 60 may also specify via the UI 20 how the platform 10 will respond to specific product requests.

As shown in FIG. 1, the platform 10 (or at least the components 30 and 40 thereof) are also operatively connected in the usual manner to a wireless telecommunications network 70, e.g., a cellular or other like mobile telecommunications network. Suitably, a consumer or other mobile device user 72 employs a wireless and/or mobile device 74 (e.g., such as a mobile telephone, a wireless PDA, a wireless or mobile smart-phone, a laptop computer equipped with a wireless adapter card, etc.) that is also operatively connected to the network 70 to selectively access and/or otherwise communicate with the platform 10 and/or the components 30 and/or 40 thereof. Moreover specifically, in response to particular requests received from the user 72 and/or other suitable triggers, the CRE 30 dynamically generates or otherwise renders content, e.g., such as WAP pages, that are delivered over the network 70 to a mobile browser running on the mobile device 74. Suitably, the layouts of respective pages are controlled in accordance with preferences and/or parameters, e.g., that are optionally selected or otherwise set via the UI 20 and/or stored in the DB 12. Optionally, a user (e.g., such as the user 60) may select from a variety of predefined templates or may design customized page layouts to meet their particular specifications. Specific page layouts, e.g., determine background color and/or characteristics, the size and/or location of text and/or images, the placement of buttons and/or link (such as payment options, etc.), the placement and/or size of text boxes for the inputting additional information by the user 72, etc.

Suitably, via the network 70, the platform 10 and the wireless or mobile device 74 of the user 72 selective exchange text or other like messages with one another, e.g., employing SMS, Multimedia Message Service (MMS), Enhanced Media Service (EMS), and/or other like messaging services. The CTE 40 is employed by the platform 10 to track related messages and provide a conversational context for the communications exchanged between the platform 10 and the device 74. Accordingly, depending upon the conversational context as tracked by the CTE 40, the platform 10 optionally responds differently to receipt of otherwise identical messages from the user 74. In effect, the CTE 40 provides a "state-full" interpretation upon which to base future responses to received messages obtained via an otherwise stateless protocol. That is to say, the CTE 40 tracks the state of a particular conversation carried out by the exchange of messages using essentially stateless protocols such as, e.g., SMS, MMS, EMS, etc., and based upon the current state of the conversation, the CTE 40 allows the platform 10 to automatically response in different ways to otherwise identical messages received from the user 72.

In practice, the CTE 40 identifies which messages are from the same user (such as user 74), e.g., by monitoring or otherwise detecting the MSID (Mobile Station ID) or telephone number of the mobile device sending the message (e.g., the mobile device 74). In this way, a particular conversational context can be limited to and/or built-up around only those communications or messages exchanged between the respective parties to a particular conversation. Additionally, only those subsequent messages received within a set or otherwise determined time period (e.g., as measured from a preceding sent message) are considered by the CTE 40 as part of the same conversation. Finally, the CTE 40 monitors the current state of the conversation along with the content of any received message in the same conversation to allow the platform 10 to determine the appropriate response.

Notably, the platform 10 may optionally be used not only for more traditional m-commerce transactions (e.g., involving the sale of particular goods and/or services), but also for the transactional exchange of information. For example, a given merchant may be a bank employing the platform 10 to provide its customers (e.g., such as the user 72) access to their bank account information (e.g., account balance, etc.) from their mobile device 74. In another example, a merchant may use the platform 10 to provided customers (e.g., such as the customer 72) store information regarding the merchant's "brick-and-mortar" facilities, e.g., store locations, hours of operation, etc. In yet another example, a merchant may use the platform 10 to allow customers (e.g., such as the customer 72) to pay bills (e.g., utility bills, rent, etc.) from their mobile device 74. Accordingly, the CTE 40 is considerably advantageous for distinguishing the particular context of a given conversation.

To better understand the operation and/or role of the CTE 40, consider the following example. Assume the user 60 has employed the UI 20 to define a keyword "loc" such that if the platform 10 receives a message (e.g., from the user 72) containing the keyword "loc", then the platform 10 returns a reply message (e.g., also defined by the user 60 via the UI 20) containing a partial list of store locations. Also, assume that the user 60 has defined the keyword "m" to mean a request for more information. Additionally, assume that in fact the platform 10 receives a message (e.g., in SMS, MMS, EMS or other like form) from the device 74 of the user 72 over the network 70, which message contains the keyword "loc", and accordingly, the platform 10 returns a message in accordance with the defined reply, i.e., including the partial list of store locations. In this case, the CTE 40 will recognize that a conversation has begun between the platform 10 and the device 74 regarding store locations, and will recognize that the current state of the conversation has presently concluded with the platform 10 providing the device 74 a partial list of store locations. As can be appreciate, the CTE 40 has in this manner established a context for the present conversation and maintains or is otherwise monitoring the state of the conversation within that context. Next, assume that the platform 10 receives a message containing the keyword "m" from the device 74, i.e., after having recently (i.e., within a prescribed time limit) sent the reply message including the partial list of store locations in response to having previously received the message containing the keyword "loc" from the same user (e.g., user 72). In this instance, the CTE 40 remembers the current state and context of the present conversation, and accordingly, instructs the platform 10 to sent a second reply message, e.g., containing additional store locations. As can be appreciate, this is a proper reply to the message "m" given the state and context of the current conversation. However, if the CTE 40 were to establish a different context for the conversation and/or recognize that the conversation was in a different state, then suitably the CTE 40 would have instructed the platform 10 to provide a different reply to an otherwise identical request or message (i.e., one containing the keyword "m"). That is to say, even though the message received from the device 74 would otherwise be the same, the response returned from the platform 10 would be a different reply—namely, a reply appropriate for the context and state then established and/or remembered for the given conversation by the CTE 40. Of course, the forgoing is merely an illustrative example, and those of ordinary skill in the art will appreciate that many other such examples can readily be envisioned in which the CTE 40 is employed by the platform 10 to establish a context and/or monitor the state of a given conversation carried out by exchanging messages transmitted over the network 70 using a stateless protocol such as, e.g., SMS, MMS, EMS, etc.

As previously stated, the platform 10 supports also supports more traditional m-commerce transactions (i.e., purchase and/or sales transactions). In particular, in response to SMS, MMS, EMS, text, e-mail and/or other like messages received over the network 70 from mobile device 74 of the user 72, the CRE 30 dynamically generates or otherwise renders content, e.g., such as WAP pages or the like, that are delivered over the network 70 to a mobile browser running on the mobile device 74.

In practice, the user 72 optionally employs the device 74 to initiate a purchase transaction. For example, the user may see a product advertised on television (e.g., a paid television program or infomercial or advertisement, a product featured in general television programming segment, etc.), a product advertised in radio programming, a catalog or print media and/or other advertising, etc. Suitably, the user 72 is in this manner instructed to send an appropriate message (i.e., containing one or more specified keywords and/or other content) with the mobile device 74 to a designated address, e.g., such an SMS shortcode, e-mail address, telephone number, etc. In accordance with the designated address, the message is accordingly routed over the network to the platform 10. Recall, in practice, the platform 10 generally serves a plurality of merchants. Accordingly, the platform 10 is optionally provisioned with one or more separate SMS shortcodes or other destination addresses for each merchant served. In this manner, the platform 10 is able to readily differentiate and/or identify which merchant a particular received message relates to based upon the particular SMS shortcode or other like destination address to which the message is addressed.

Recall that via the UI 20 selected keywords are optionally associated with particular products. In this case, the keyword(s) and/or content within a message itself is suitably used by the platform 10 to determine the product or service to which the message relates. Additionally, the keyword(s) and/or content may also be used to identify the particular merchant to which a received message relates, e.g., assuming different merchants did associate the same keywords with different products.

In one suitable embodiment, when the platform 10 receives a message from the mobile device 74 requesting to purchase a product or requesting product information (e.g., as indicated by a keyword contained in the message), the platform 10 engages the CRE 30 to supply relevant content over the network 70 to a browser on the mobile device 74. Alternately, recall that by using the UI 20 a particular URL address or the like may be associated with a particular product page or other page supplied by the CRE 30. In which case, the user 72 may employ the browser running on their device 74 to directly access the particular page or content of interest from the CRE 30, e.g., without first submitting an SMS or other like message to the platform 10.

In another embodiment, when the user 72 sends an appropriate message requesting a product purchase page or other information to the platform 10, e.g., such as an SMS or other like message, the platform 10 returns a message to the device 74 containing a URL address or other link which the user 72 may optionally select to request or otherwise trigger delivery of the relevant content from the CRE 30 to the browser running on the device 74. Suitably, the link sent in the message is a reduced or shortened URL address, e.g., in order to accommodate the limited space available in an SMS or other like message. When the shortened or reduced length link is selected, the platform 10 suitably recognizes the "shorthand notation" and expands the link to its full size in order to direct the CRE 30 to supply the appropriate content. Additionally, the link is optionally tagged with a tracking ID or other like appended or imbedded identifier. In this manner, the platform 10 can track or otherwise monitor traffic accessing a particular URL or other content being supplied, e.g., by the CRE 30.

In yet another embodiment, such a message requesting to purchase a product or requesting product information may trigger an interactive voice response (IVR) unit 16 to place a voice call to the mobile device 74 over the network 70. Suitably, the type response is dictated by the preference and/or parameters stored in the DB 12 and/or previously provided to the platform 10 via the UI 20.

Of course, where the response is a return call from the IVR unit 16, optionally the user 72 may complete the purchase and/or obtain any desired product and/or other information made available by the merchant—i.e., as is conventional for IVR assisted transactions.

Alternately, when the CRE 30 is invoked, it dynamically generates, renders and/or otherwise supplies the appropriate content in accordance with the preferences and/or parameters obtained from the DB 12. Suitably, when the device 74 access the content being provided by the CRE 30, the platform 10 recognizes the type of device 74 accessing the content, e.g., by monitoring the device ID (such as MSID, mobile telephone number, etc.) and/or header or other information received in communications from the device 74. For example, the device 74 may be a wireless PDA or a mobile telephone, etc. Accordingly, different mobile devices and/or mobile telecommunication services providers support different capabilities, i.e., different screen sizes, different browsers or browser features, etc. Suitably, mobile device profiles are maintained in a device profile DB 14 or other suitable location accessible by the platform 10 and/or CRE 30. For example, the profiles for each different kind of device and wireless service provider include details about various aspects of the device and/or features supported. Accordingly, in the CRE 30 also checks the device profile in the DB 14 in order to dynamically customize the output content being generated and/or render so as to be optimized for the device 74 receiving the content.

In one exemplary embodiment, the platform 10 or a suitable adjunct server (not shown) is provisioned or otherwise equipped to complete or facilitate authentication, authorization and/or other processing of m-commerce transaction payments for any one or more of a variety of different payment brands, e.g., including traditional payment brands as well as alternate payment brands. More specifically, mobile content provided by the CRE 30 to the mobile device 74 may optionally include one or more links or other selectable payment options that the user 72 may chose as they see fit to complete a purchase or other like m-commerce transaction. Alternately, an SMS or other like message provided by the platform 10 to the mobile device 74 may similarly include multiple payment options. Depending on the payment brand selected by the user 72, one or more items of additional payment information (e.g., account ID, card information such as expiration date, card number, etc., password or other authentication credentials, user information such as name, address, etc.) may have to be collected from the user 72 to complete authentication, authorization and/or other processing of the payment. Accordingly, the platform 10 optionally collects or facilitates in collecting from the user 72 over the wireless network 70 the appropriate payment information in accordance with appropriate protocols for the selected payment brand and submits the payment for processing to a suitable payment processor or may optionally process the payment itself. In collecting the payment information, the platform 10 optionally communicates, e.g., over the Internet 50, with suitable web and/or other like servers that provide requests for particular payment information that has to be obtained to complete processing of the payment. In this manner, the platform 10 optionally determines which payment information to collect and formulates and/or otherwise generates suitable SMS or other like messages or WAP content that is then sent to the mobile device 74 of the user 72 over the wireless network 70 in order to collect the particular payment information. Assuming the user 72 responds, the platform 10 optionally receives the returned message or the like containing the payment information and in turns communicates the information to the requesting servers, e.g., to complete authentication, authorization and/or other payment processing. Optionally, the result of any payment processing (e.g., approved, denied or otherwise) is accordingly returned to the platform 10, e.g., from the requesting server or otherwise. Suitably, for one or more particular merchants being served by the platform 10, the payment processing result along with any other appropriate order information may be automatically sent (e.g., via the Internet 50 or otherwise) from the platform 10 directly or otherwise to the merchant's order management system (OMS) or other like back-end fulfillment processing system. In this manner, the merchant's OMS or other like back-end fulfillment system may for example treat the order as any other pre-paid or otherwise completed order.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. An electronic platform to facilitate mobile commerce transactions between merchants and mobile device users, said platform comprising:
   one or more processors; and
   one or more non-transitory computer readable mediums having computer executable instructions that, when executed by the one or more processors, cause the one or more processors to:
   provide a user interface to a merchant;
   receive from the merchant via the user interface a plurality of parameter settings operations for the merchant;
   monitor messages exchanged between the platform and the mobile device users accessing the platform over a wireless telecommunications network via respective mobile devices;
   group messages into a conversation based on an identification of a mobile device;
   keep track of a state of the conversation;
   render mobile content in response to receiving a request from the mobile device for mobile content, said request being related to the merchant and said mobile content being rendered in accordance with the parameter settings entered via the user interface, wherein the rendered content includes content viewable by a mobile browser of the mobile device; and
   send the rendered mobile content as part of a new message in the conversation to the mobile device from which the request was received;
   wherein the mobile content is adjusted by the platform depending upon the state of the conversation.

2. The platform of claim 1, wherein messages of the monitored messages are grouped into the conversation further based upon at least one of: a message send time, and a message receipt time.

3. The platform of claim 1, wherein the response by the platform to receipt of otherwise identical message content from the mobile device is different depending upon if a message is recognized as being associated with a particular conversation.

4. The platform of claim 1, wherein the rendered content includes Wireless Application Protocol (WAP) pages.

5. The platform of claim 1, wherein the instructions further cause the one or more processors to store the parameter settings entered via the user interface in a database.

6. The platform of claim 1, wherein the rendered mobile content is further rendered in accordance with a mobile device profile, the mobile device profile including at least one device parameter that identifies a capability of a mobile device of the respective mobile devices for receiving mobile content.

7. The platform of claim 1, wherein the instructions further cause the one or more processors to group the messages into the conversation further based on a message send time, a message receipt time, and an identifier of the mobile device sending a message.

8. The platform of claim 1, wherein the monitored messages are Enhanced Message Service (EMS) messages.

9. A method for facilitating mobile commerce transactions between merchants and mobile device users, said method carried out by one or more processors of an electronic platform and comprising:
   providing a user interface to a merchant;
   receiving from the merchant via the user interface a plurality of parameter settings that regulate operations for the merchant;
   monitoring messages exchanged between the platform and mobile device users accessing the platform over a wireless telecommunications network via respective mobile devices;
   grouping messages into a conversation based on an identification of a mobile device;
   keeping track of a state of the conversation;
   rendering mobile content in response to receiving a request from a mobile device for mobile content, said request being related to the merchant and said mobile content being rendered in accordance with the parameter settings entered via the user interface, wherein the rendered content includes content viewable by a mobile browser of the mobile device; and
   sending the rendered mobile content as part of a new message in the conversation to the mobile device from which the request was received;
   wherein the mobile content is adjusted by the platform depending upon the state of the conversation.

10. The method of claim 9, wherein the monitored messages are grouped into the conversation further based upon at least one of: a message send time, and a message receipt time.

11. The method of claim 9, wherein the response by the platform to receipt of otherwise identical message content from a mobile device is different in response to a message being recognized as being part of a particular conversation.

12. The method of claim 9, wherein the content rendered is generated as Wireless Application Protocol (WAP) pages.

13. The method of claim 9, said method further comprising:
   storing the parameter settings entered via the user interface.

14. The method of claim 9, said method further comprising:
   storing a plurality of mobile device profiles for different types of mobile devices, each profile including at least one device parameter that identifies a capability of the corresponding mobile device for receiving mobile content.

15. The method of claim 14, wherein said rendering further comprises:
   consulting the stored profiles in connection with generating mobile content for a specific mobile device; and customizing the generated mobile content in accordance with the stored profile corresponding to the type of mobile device for which the content is being generated.

16. The method of claim 9, wherein the parameter settings include product parameters.

17. The method of claim 9,
wherein messages of the monitored messages are grouped into the conversation further based on a message send time, a message receipt time, and an identifier of the mobile device sending a message.

* * * * *

UNITED STATES PATENT AND TRADEMARK OFFICE
CERTIFICATE OF CORRECTION

| | |
|---|---|
| PATENT NO. | : 10,074,117 B2 |
| APPLICATION NO. | : 12/119272 |
| DATED | : September 11, 2018 |
| INVENTOR(S) | : Chandra S. Balasubramanian et al. |

Page 1 of 1

It is certified that error appears in the above-identified patent and that said Letters Patent is hereby corrected as shown below:

In the Claims

Column 9, Line 22, Claim 1, after "platform" insert -- configured --

Column 9, Line 32, Claim 1, after "settings" insert -- that regulate --

Signed and Sealed this
Twenty-second Day of January, 2019

Andrei Iancu
*Director of the United States Patent and Trademark Office*